No. 882,652. PATENTED MAR. 24, 1908.
A. SCHAPER.
VALVE BUNG.
APPLICATION FILED JAN. 14, 1907.
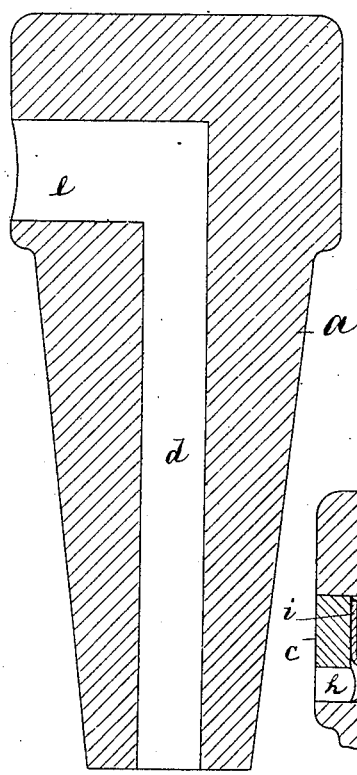
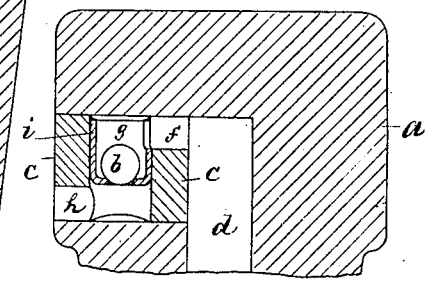
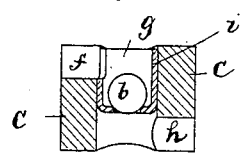
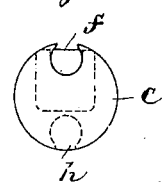
Witnesses:
William Schulz
Adolph Miner
Inventor:
Albert Schaper
by his attorney

UNITED STATES PATENT OFFICE.

ALBERT SCHAPER, OF HANOVER, GERMANY.

VALVE-BUNG.

No. 882,652.  Specification of Letters Patent.  Patented March 24, 1908.

Application filed January 14, 1907. Serial No. 352,121.

*To all whom it may concern:*

Be it known that I, ALBERT SCHAPER, a citizen of Germany, residing at Hanover, Germany, have invented new and useful Improvements in Valve-Bungs, of which the following is a specification.

This invention relates to a bung for barrels provided with a reversible valve-containing plug, and so constructed that it may be used either during the fermenting period, or while the barrel is being tapped.

In the accompanying drawing: Figure 1 is a longitudinal section of the bung with the plug removed; Fig. 2 a similar section of the upper part of the bung, with the plug inserted; Fig. 3 a longitudinal section through the plug, showing it reversed; and Fig. 4 an end view of the plug.

The bung $a$, is provided with an axial bore $d$, and a communicating cylindrical opening $e$, extending at right angles thereto. Within $e$, is snugly fitted a cylindrical reversible plug $c$ composed of cork, which is so cut that its pores extend in a direction vertical to its longitudinal axis, so as to prevent gases or air from escaping.

Plug $c$, is provided with an approximately Z-shaped channel composed of three communicating ducts $f$, $g$, $h$. Of these, central duct $g$, which is of larger diameter than ducts $f$, and $h$, passes through plug $c$, in a direction vertical to its axis, or parellel to the axis of the bung. Ducts $f$, and $h$, extend along the cylindrical surface of the plug in opposite directions and at opposite ends of duct $g$.

Within duct $g$, is snugly fitted a perforated cylindrical valve casing or cup $i$, containing a ball valve $b$. Parts $i$, and $v$, should be composed of a material which is not liable to be attacked by the liquid contents of the barrel and by the gases passing through the bung. So also, it is important for a reliable operation of the valve, that the latter be very light. For both of the above reasons, cup $i$, as well as valve $b$, are preferably composed of aluminium.

Cup $i$ is of cylindrical form and extends from its perforated base, forming the valve-seat, to the top, and if desired also to the bottom of the plug. In this way the cup forms a lining for the duct $g$ and prevents the liquid from flowing from duct $f$ into duct $h$, through the upright pores of the cork. Opposite duct $f$, the upper edge of the cup is notched to establish communication between the interior of the cup and the interior of the duct. The cylindrical extension of the valve seat furthermore protects the cork wall against abrasion by the valve and prevents any displacement of the valve-seat within the duct.

If the bung is used during the fermentation period, plug $c$, is inserted to occupy the position shown in the drawing. Here the gases generated within the barrel may readily escape through ducts $h$, $g$, $f$, by lifting ball $b$, off its seat, while air is prevented from entering (Fig. 3). When the barrel is to be tapped, plug $c$, is reversed axially, so that duct $f$, is placed in communication with bore $d$, while duct $h$, is placed in communication with the atmosphere, so that the air may now freely enter through ducts $h$, $g$, $f$, (Fig. 2), valve $b$, being now raised off its seat by suction.

I claim:

A valve bung, combined with a reversible cork plug having a longitudinal duct and a pair of transverse ducts extending in opposite directions from the top and bottom of the longitudinal duct respectively, an inclosed cup having a valve-seat and a cylindrical wall that extends within the longitudinal duct from the valve-seat to the surface of the plug, and a valve within said cup, substantially as specified.

Signed by me at Hanover, Germany, this 31st day of December, 1906.

ALBERT SCHAPER.

Witnesses:
L. VAN DER RUAN,
PAUL R. THOMPSON.